United States Patent
Sun

(10) Patent No.: US 8,006,106 B2
(45) Date of Patent: Aug. 23, 2011

(54) METHOD AND SYSTEM FOR FLEXIBLY SUPPLYING POWER TO A HIGH-END GRAPHICS CARD USING AN OFF-CARD VOLTAGE CONVERTER MODULE

(75) Inventor: Mike Sun, Guangdong (CN)

(73) Assignee: NVIDIA Corporation, Santa Clara, CA (US)

( * ) Notice: Subject to any disclaimer, the term of this patent is extended or adjusted under 35 U.S.C. 154(b) by 806 days.

(21) Appl. No.: 12/017,283

(22) Filed: Jan. 21, 2008

(65) Prior Publication Data

US 2009/0172236 A1  Jul. 2, 2009

(30) Foreign Application Priority Data

Dec. 27, 2007  (CN) .......................... 2007 1 0301396

(51) Int. Cl.
*G06F 1/26* (2006.01)

(52) U.S. Cl. .......................... 713/300; 345/519; 710/300

(58) Field of Classification Search .................. 713/300; 345/519; 710/300

See application file for complete search history.

(56) References Cited

U.S. PATENT DOCUMENTS

| | | | | |
|---|---|---|---|---|
| 6,903,950 | B2 * | 6/2005 | Afzal et al. | 363/142 |
| 7,269,750 | B1 * | 9/2007 | Garritsen et al. | 713/322 |
| 7,592,715 | B2 * | 9/2009 | Hong | 307/45 |
| 2005/0071695 | A1 | 3/2005 | Kwatra | |
| 2005/0285864 | A1 * | 12/2005 | Diamond et al. | 345/520 |

FOREIGN PATENT DOCUMENTS

CN  1609817  10/2004

OTHER PUBLICATIONS

Excerpts from translated Office Action, Chinese App. No. 200710301396.3, dated Apr. 13, 2010.

English translation of CN 1609817, provided as explanation of relevance.

* cited by examiner

*Primary Examiner* — Albert Wang

(74) *Attorney, Agent, or Firm* — Patterson & Sheridan, LLP.

(57) ABSTRACT

A method and system for flexibly supplying power to a high-end graphics card is described. The graphics system includes the high-end graphics card and also a configurable power supply module, which is physically separated to the graphics card and connected to a power source external to the graphics system. The configurable power supply module converts a first voltage from the power source to a second voltage for the graphics card, wherein the second voltage satisfies a set of power supply specifications required by the graphics card.

13 Claims, 4 Drawing Sheets

METHOD AND SYSTEM FOR FLEXIBLY SUPPLYING POWER TO A HIGH-END GRAPHICS CARD USING AN OFF-CARD VOLTAGE CONVERTER MODULE

CROSS-REFERENCE TO RELATED APPLICATIONS

This application claims the priority benefit of People's Republic of China SIPO Application No. 200710301396.3, filed on Dec. 27, 2007 in the People's Republic of China.

BACKGROUND OF THE INVENTION

1. Field of the Invention

The present invention relates to power management technologies for a graphics system, and more particularly, to a method and system for flexibly supplying power to a high-end graphics card.

2. Description of the Related Art

Unless otherwise indicated herein, the approaches described in this section are not prior art to the claims in this application and are not admitted to be prior art by inclusion in this section.

With the increasing demand for realism and interactivity in graphics applications, high-end graphics processing units (GPUs) are required to handle more and more complex image processing tasks. These high-end GPUs include increasing number of circuit elements and thus consume significant amount of power. In a typical graphics card, the two primary power-consuming components are the GPU and the local memory unit. To ensure they operate properly, the graphics card includes some power supply circuits on the card to ensure theses components receive sufficient amount of power. With such power supply circuits placed alongside the GPU and the local memory unit on the same graphics card, the size of such a graphics card tends to be large. To make the matter worse, the power supply circuits are customized to support only a particular GPU type and/or a particular local memory unit type. So, if a different GPU type and/or a local memory unit type is needed, then the power supply circuits need to be redesigned, and the layout of the graphics card also needs to be altered. Moreover, having the power supply circuits, the GPU, and the local memory unit all on the same graphics card renders heat dissipation much more difficult to deal with.

To illustrate, FIG. 1 is a simplified block diagram of a conventional high-end graphics system 100. The graphics system 100 includes a GPU 102, a local memory unit 104, and other components such as digital to analog converter (DAC) and a phase lock loop device (PLL). The DAC and the PLL are collectively referred to as a conversion block 106, and a power supply unit 108. The power supply unit 108 is on the same circuit board with the GPU 102, the local memory unit 104, and the conversion block 106 of the graphics system 100. The graphics system 100 is typically placed into a Peripheral Component Interface Express (PCIe) slot of a computing device.

The power supply unit 108 is configured to supply voltages to the GPU 102, the local memory unit 104, and the conversion block 106 via NVVDD, FBVDD, and DACVDD and PLLVDD signals, respectively. The PCIe slot generally only supplies a power of 75 watts, which is insufficient for a high-end graphics card, such as the graphics system 100, that consumes anywhere from 200 to 300 watts. As the result, the power supply unit 108 needs additional wattage to drive the graphics system 100. A typical approach is for the graphics system 100 to receive power from an external power source (not shown in FIG. 1), such as the power supply of the computing device to which the graphics system 100 is attached to. Because the wattages from the external power source can be higher than what the system requires, dedicated power supply circuits are included in the power supply unit 108 to handle the needed conversion, which results in an increased in size for the power supply unit 108. As discussed above, if the graphics system 100 is redesigned to support a different GPU and a different local memory unit than the GPU 102 and the local memory unit 104, then the power supply unit 108 and the layout of the graphics system 100 also need to be redesigned. Having the power supply unit 108 along with the GPU 102, the local memory unit 104, and the conversion block 106 all on the same circuit board further worsens heat dissipation issues for the graphics system 100.

Thus, what is needed in the art is a method and system for flexibly supplying power to a high-end graphics card in a cost effective manner and addresses at least the problems set forth above.

SUMMARY OF THE INVENTION

A method and system for flexibly supplying power to a high-end graphics card is described. The graphics system includes the high-end graphics card and also a configurable power supply module, which is physically separated to the graphics card and connected to a power source external to the graphics system. The configurable power supply module converts a first voltage from the power source to a second voltage for the graphics card, wherein the second voltage satisfies a set of power supply specifications required by the graphics card.

At least one advantage of the present invention disclosed herein is to eliminate the need to continue redesigning the power supply circuit whenever the power supply specification of the graphics card changes and thus shorten the time to launch such a graphics card to the market.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
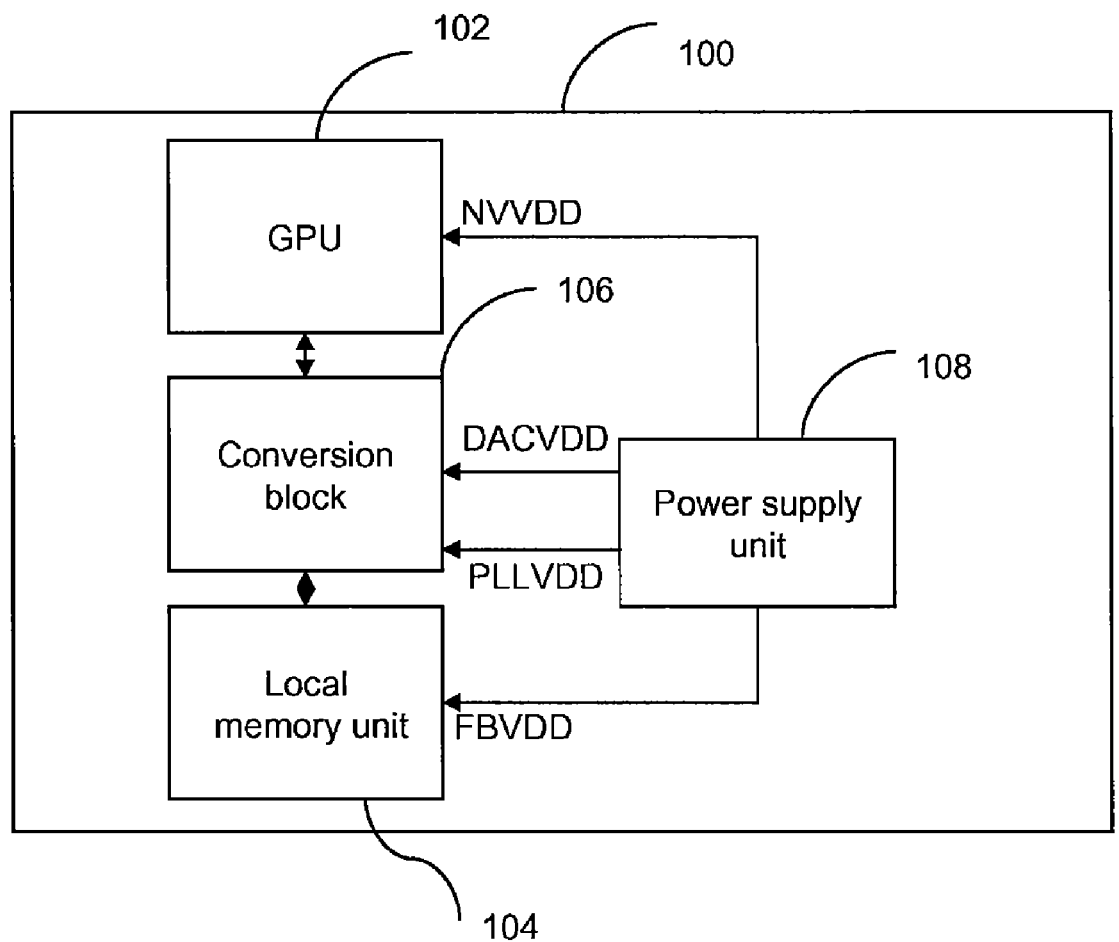
FIG. 1 is a simplified block diagram illustrating a conventional high-end graphics system with a power supply unit on the same circuit board.
Figure 2A:
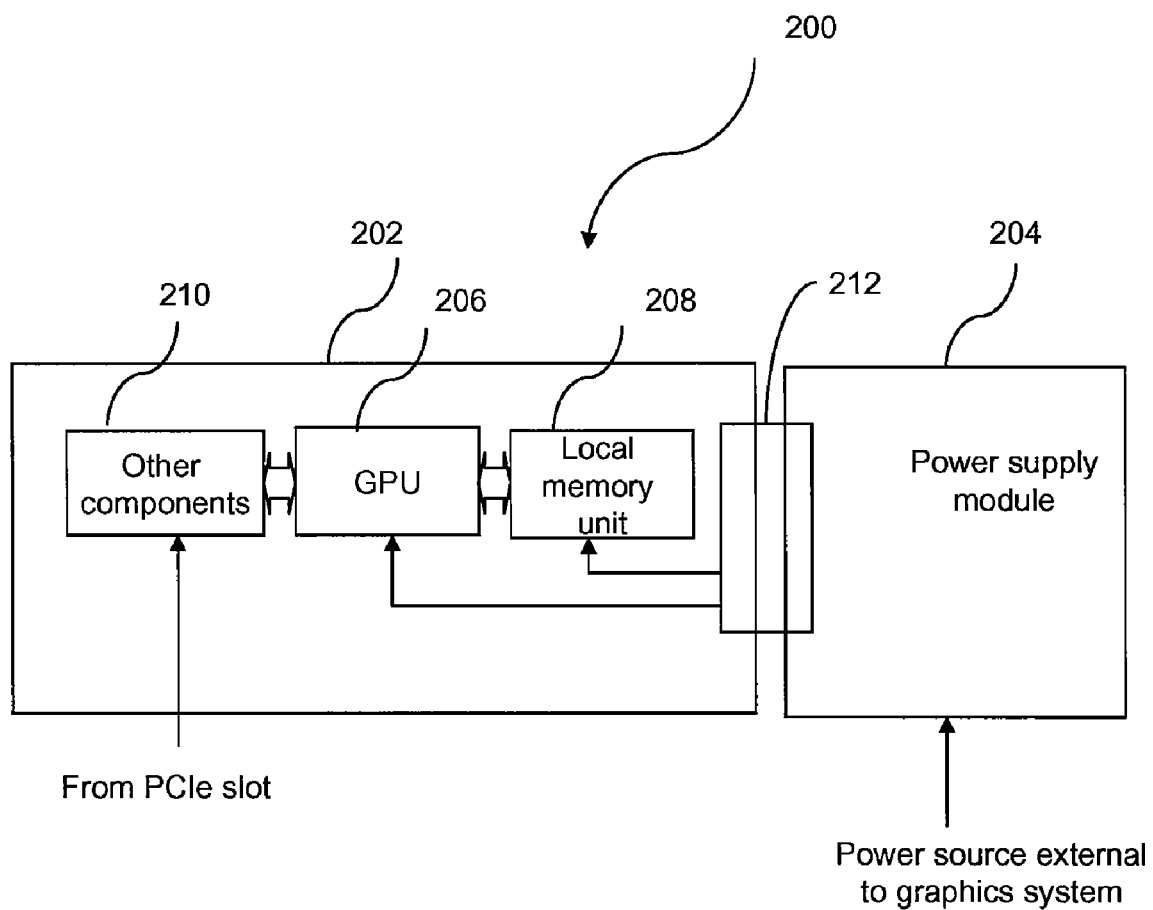
FIG. 2A is a simplified block diagram illustrating a graphics system, according to one embodiment of the present invention.

FIG. 2A is a simplified block diagram illustrating a graphics system 200, according to one embodiment of the present invention. The graphics system 200 includes a graphics card 202 and a standardized power supply module 204, which is physically separated to the graphics card 202. The graphics card 202 includes a GPU 206, a local (video) memory unit 208, and other components 210. Since the power supply module 204 does not reside on the graphics card 202, the voltages generated by the power supply module 204 is transferred to the graphics card 202 through a connecting device 212 that connects the graphics card 202 and the power supply module 204. The power supply module 204 is primarily designed to work with high-end graphics cards, which often are compatible with the Peripheral Component Interface Express (PCIe) interface. As discussed above, the 75 watts of power that the PCIe interface is capable of providing is not sufficient for a high-end graphics card consuming at least 200 to 300 watts. In one implementation, the power supply module 204 is connected to a power source (not shown) external to the graphics system 200 through external PCIe 2×3 and 2×4 connectors in order to get additional power supply. The power source external to the graphics system 200 preferably is the power supply of the computer system, in which the graphics system 200 is a part of. The additional power supply received by the power supply module 204 from the power source external to the graphics system 200 is to mainly satisfy the needs of the GPU 206 and the local memory unit 208.

In one implementation, the power supply module 204 is a standardized module, which can be configured to support operating voltage ranges that satisfy multiple power supply requirements of high-end graphics cards. The power supply module 204 receives additional power from external PCIe 2×3 and 2×4 connectors connecting to the power source external to the graphics system 200. In one implementation, via the connecting device 212, the power supply unit 204 can transfer the voltages to the GPU 206 and the local memory unit 208. Since the other components 210 of the graphics card 202 do not consume much power, they receive the needed power via the connection between the graphics card 202 and the PCIe slot of the computer system.

In one implementation, the power supply module 204 is placed in a PCI slot adjacent to the PCIe slot, in which the graphics card 202 is inserted. Alternatively, the power supply module 204 is placed at the bay typically reserved for a floppy disk drive. The type of the connecting device 212 varies according to where the graphics card 202 and the power supply module 204 are located in the computer system. If the power supply module 204 is adjacent to the graphics card 202, then coupling the two components can be accomplished via a printed circuit board with certain wirings. On the other hand, if the power supply module 204 is located at the floppy disk bay, then a flexible cable can be used to as the connecting device 212 to facilitate the connection between the power supply module 204 and the graphics card 202. In any event, one requirement for the connecting device 212 is the assurance of a low voltage drop over the course of transferring power from the power supply module 204 to the graphics card 202. A lower voltage drop across the connecting device 212 not only helps to maintain the efficiency of the power supply module 204 but also minimizes the amount of the heat dissipation associated with the connecting device 212.

Figure 2B:
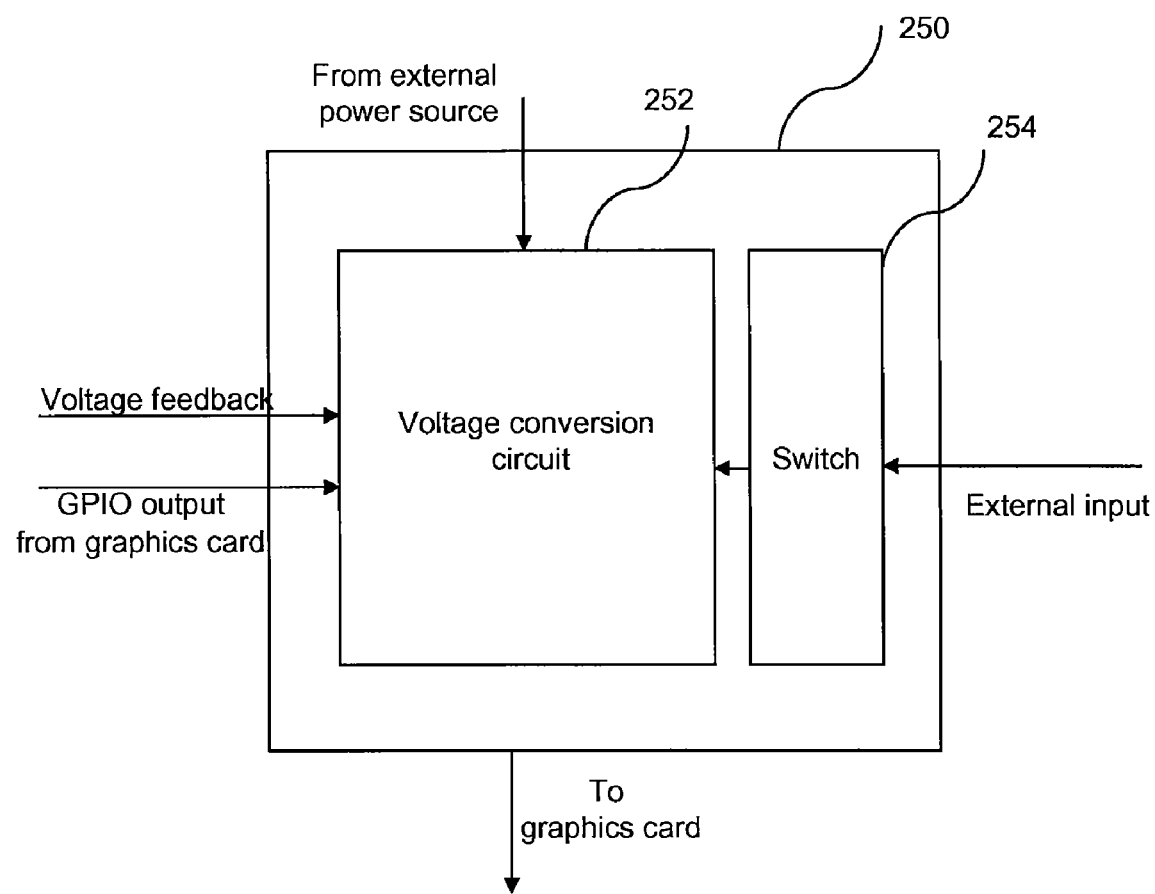
FIG. 2B is a simplified block diagram illustrating a standardized power supply module capable of satisfying different power supply requirements in one embodiment according to the present invention.

In conjunction with FIG. 2A, FIG. 2B is a simplified block diagram illustrating a power supply module 250, according to one embodiment of the present invention. The power supply module 250 includes a voltage conversion circuit 252 for converting a first direct current (DC) voltages from the power source external to the graphics system 200 to a second DC voltages to be generated by the circuit itself, and a switch 254 connected to the voltage conversion circuit 252 for adjusting voltage levels to be supplied to the graphics card 202. The switch 254 is configured based on external inputs (e.g., user inputs) associated with adjusting voltage levels to be generated by the power supply module 250, so that the output voltage levels can fall within certain operating voltage ranges required by the graphics card to which the power supply module 250 supports. Suppose the voltage conversion circuit 252 is configured to support two different operating voltage ranges required by two graphics cards. Based on the external inputs received by the switch 254, the same power supply module 250 is configured to satisfy the power supply requirements of the selected graphics card.

Voltage levels on the graphics card 202 may fluctuate for reasons such as the larger-than-expected voltage drop associated with the connecting device 212. If an output voltage level happens to fall outside the operating voltage range required by the graphics cards 202, then in one implementation, the graphics card 202 returns a feedback signal indicative of such a condition to the configurable power supply unit 250. The power supply module 250 adjusts its output voltage levels accordingly and ensures the power supply requirements of the graphics card 202 are met. In one implementation, the graphics card 202 also sends an adjustment signal through its general purpose input/output port (GPIO) to the power supply module 250. The adjustment signal is mainly to further adjust the output voltages generated by the power supply module 250 in accordance with the operating mode of the graphics card 202. For example, when the adjustment signal from the GPIO port of the graphics card 202 is "high," the voltage level generated by the power supply module 254 is adjusted to the top end of the operating voltage range required by the graphics card 202. On the other hand, when the adjustment signal of "low" is received by the power supply module 250, it adjusts the output voltage level to the low end of the required operating voltage range. So, if the graphics card 202 operates at a two-dimension (2D) that requires relatively low power consumption, then a "low" adjustment signal indicative of the less stringent requirements is sent to the power supply module 250 through the GPIO port of the graphics card 202. On the other hand, if the graphics card 202 instead operates at its 3D operating mode that demands relatively high power consumption, a "high" adjustment signal reflective of this need is sent to the power supply module 250 through the GPIO port of the graphics card 202.

Figure 3:
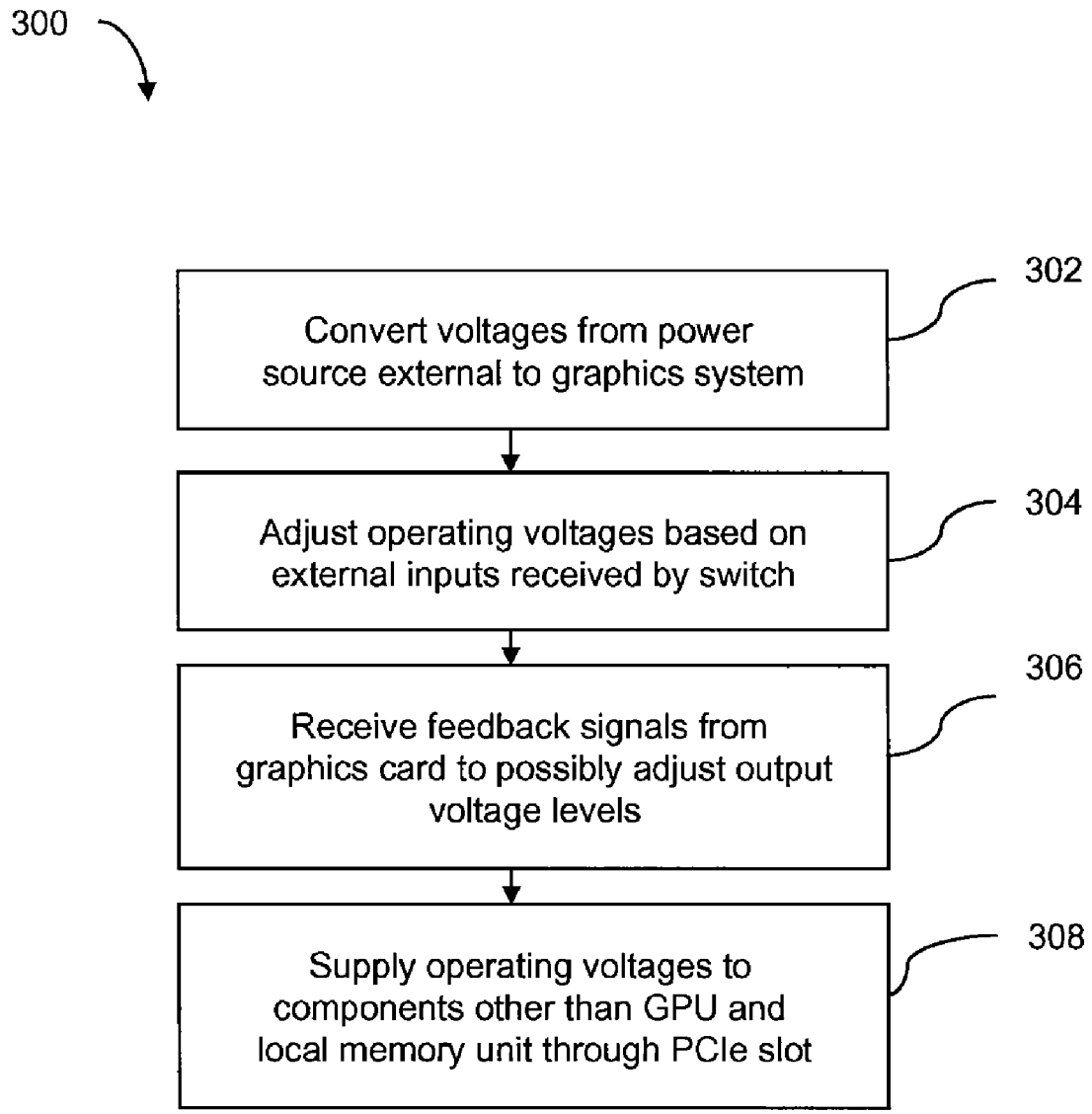
FIG. 3 of a flow chart illustrating a method of supplying power to different VGA cards 300 with the same standardized power supply module disclosed in one embodiment according to the present invention.

In conjunction with FIG. 2B, FIG. 3 is a flow chart illustrating a method 300 of flexibly supplying power to a high-end graphics card, according to one embodiment of the present invention. In step 302, the power conversion circuit 252 converts voltages from the power source external to the graphics system (e.g., the power source of the computer system in which the graphics system is a part of) to a certain operating voltage range according to the power supply requirements of the graphics cards that it supports. In one implementation, if the power conversion circuit 252 is configured to support two graphics cards, then the power conversion circuit 252 converts the voltages from the external power source to voltage levels that fall within the operating voltage ranges required by both of the graphics cards. As discussed above, based on the external inputs received by the switch 254, the voltages generated by the power supply module 250 are further adjusted. For example, the output voltage levels may be adjusted so that they fall within the requirements of the selected graphics card. It should be noted that the external inputs do not necessarily result in an adjustment in the output voltage level.

In step 306, the power supply module 250 may receive feedback signals indicative of whether the output voltage levels generated by the power supply module 250 properly fall within the operating voltage range required by the chosen graphics card and whether the output voltage levels should be further adjusted to the high or low end of the operating voltage range supported by the same graphics card. If the output voltage levels fail to fall within the operating voltage range, then the power supply module 250 is notified and proceeds to adjust the output voltage levels to satisfy the requirements of the graphics card. In addition, when the graphics card operates in an idle mode or 2D mode, it asserts a "low" adjustment signal through the GPIO port of the graphics card to the power supply module 250. The power supply module 250 responds to the adjustment signal by adjusting the output voltage levels towards the low end of the operating voltage range. On the other hand, when the graphics card kicks into a 3D operating mode, it asserts a "high" adjustment signal again through the GPIO port of the graphics card to the power supply module 250. The power supply module 250 here adjusts the output voltage levels towards the high end of the operating voltage range. In short, this described feedback mechanism enables one implementation of the power supply module 250 to dynamically adjust the output voltage levels according to the varying requirements of the graphics cards. In step 308, one implementation of the power supply module 250 is solely responsible for supplying power to the GPU and the local memory unit, and has the other components receive power provided through the PCIe slot of the computer system.

According to one embodiment of the present invention, a graphics system includes a physically separated power supply module capable of supplying different operating voltages to satisfy requirements of one or more graphics cards supported by the power supply module. The switch of the power supply module and the feedback signals generated by the graphics card enable this configurable power supply module to support more than one high-end graphics card. Consequently, different high-end graphics cards can be implemented in a relatively short amount of time without having to customize a power supply circuitry to satisfy each set of operating voltage requirements. In addition, with the power supply module physically detached from the graphics card, the size of the high-end graphics card is reduced while the heat dissipation issues can be addressed more easily.

The above description illustrates various embodiments of the present invention along with examples of how aspects of the present invention may be implemented. The above examples, embodiments, instruction semantics, and drawings should not be deemed to be the only embodiments, and are presented to illustrate the flexibility and advantages of the present invention as defined by the following claims.

I claim:

1. A graphics system, comprising:
   a graphics card that includes a graphics processing unit (GPU), a local memory unit, and one or more additional components; and
   a configurable power supply module, physically separated from the graphics card and connected to a power source external to the graphics system, that converts a first voltage from the power source to a second voltage for the graphics card, wherein the second voltage satisfies a set of power supply specifications required by the graphics card,
   wherein the second voltage further provides power to the GPU and the local memory unit, and separate voltages generated by the power source provide power to the one or more additional components.

2. The graphics system of claim 1, wherein the configurable power supply module further comprises a voltage conversion circuit to convert the first voltage and a switch to potentially adjust the second voltage based on external inputs received by the switch.

3. The graphics system of claim 2, wherein the graphics card further comprises an input/output port capable of sending a feedback signal to the voltage conversion circuit to further adjust the second voltage.

4. The graphics system of claim 3, wherein the input/output port is a general purpose input/output (GPIO) port and the feedback signal is indicative of a power consumption level of the graphics card.

5. The graphics system of claim 1, wherein the graphics card is inserted in a Peripheral Component Interface Express (PCIe) slot of a computer system and through the PCIe slot, the separate voltages are supplied to the one or more additional components of the graphics card.

6. The graphics system of claim 1, wherein the configurable power supply module is connected to the graphics card through a connecting device.

7. The graphics system of claim 6, wherein the connecting device is associated with a low voltage drop.

8. The graphics system of claim 1, wherein the configurable power supply module is placed in a PCI slot.

9. The graphics system of claim 1, wherein the configurable power supply module is placed in a bay of a computer system suitable to house a disk drive.

10. A method for flexibly supplying power to a high-end graphics card that includes a graphics processing unit (GPU), a local memory unit, and one or more additional components, the method comprises:
    converting a first voltage from a power source external to the graphics card to a second voltage for the graphics card by a configurable power supply module physically separated from the graphics card, wherein the second voltage satisfies a set of power supply specifications required by the graphics card;
    potentially adjusting the second voltage based on external inputs and a feedback signal generated by the graphics card;
    supplying the second voltage to the GPU and the local memory unit; and
    supplying separate voltages generated by the power source to the one or more additional components.

11. The method of claim 10, further comprising supplying the separate voltages to the one or more additional components of the graphics card through a Peripheral Component Interface Express (PCIe) slot.

12. The method of claim 10, wherein the feedback signal is indicative of a power consumption level of the graphics card.

13. The method of claim 10, wherein the feedback signal is indicative of whether the second voltage satisfies the set of power supply specifications required by the graphics card.

* * * * *